Sept. 8, 1936.   G. F. CROWLEY   2,053,519
TIRE BEAD
Filed May 25, 1936
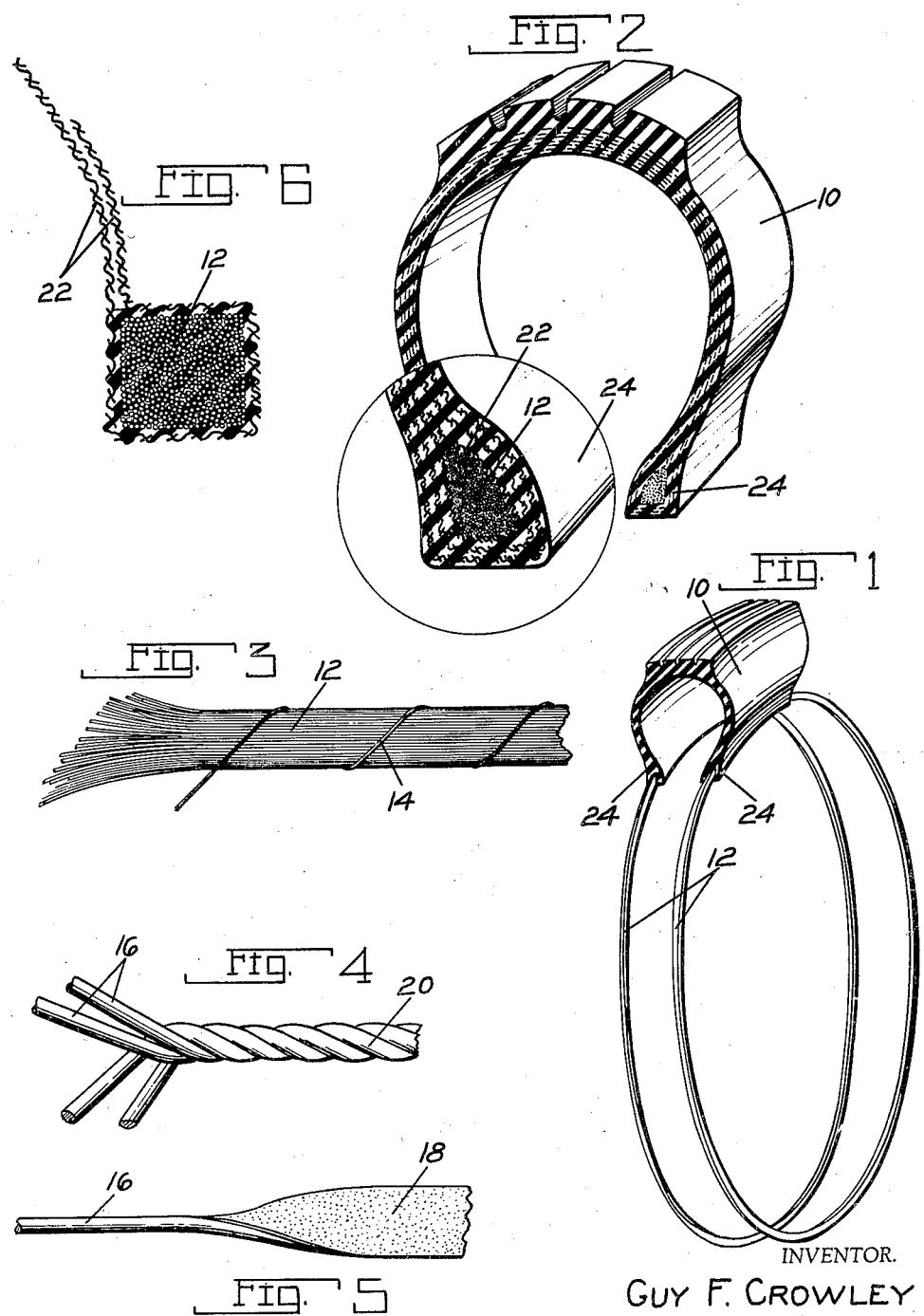
INVENTOR.
GUY F. CROWLEY
BY McConkey & Booth
ATTORNEY.

Patented Sept. 8, 1936

2,053,519

UNITED STATES PATENT OFFICE 2,053,519

TIRE BEAD

Guy F. Crowley, Bridgeport, Conn., assignor to National Standard Company, Niles, Mich., a corporation of Michigan Application May 25, 1936, Serial No. 81,564

3 Claims. (Cl. 152—13)

This invention relates to tire beads, and more particularly to the reinforcement of tire beads to prevent stretching when the tires are in use.

Heretofore it has been the practice to reinforce tire beads with rings built up of wire braid or tape. Such reinforcements are in general very satisfactory, and they do prevent any substantial stretching of the beads. However, it sometimes happens in use that moisture will work through the material of the bead to the wire, causing it to corrode. This is partly caused by the fact that the wire reinforcements have considerable rigidity, and distorting forces acting on them tend to loosen the rubber from the wires so that moisture can reach the surface of the metal. Corrosion, once started, of course tends further to destroy the bond between the wire and the rubber.

An important object of the present invention is to provide a tire bead reinforcement which is less rigid than the wire reinforcements, and which will not corrode even if moisture does reach it, and which is nevertheless substantially non-stretchable. To this end I reinforce the bead of the tire by rings of parallelly-arranged non-metallic fibers vulcanized into the material of the tire, the tire material thus serving as a bond which firmly binds the fibers together.

Thus the resistance to stretch does not depend solely on the mechanical interlocking of the fibers with each other, as is the case with most uses of non-metallic fibrous materials, since the binding of the fibers together by the vulcanized tire material makes the tensile strength of the reinforcement the sum of the tensile strengths of all of the separate fibers, whereby the reinforcement when vulcanized into the bead has a resistance to stretch much greater than before it is put into the tire.

The fibers may be arranged parallel to each other and extending circumferentially of the tire, or in yarns or strands so arranged, or in yarns formed from interfelted cellulose fibers in a pulp such as wood pulp, or in other forms. These arrangements of the fibers, and various other objects and features of the invention, will be apparent from the following description of the illustrative embodiments shown in the accompanying drawing, in which:

Figure 1 is a perspective view of part of a tire, with the reinforcements for the beads extending all the way around;

Figure 2 is a perspective view of part of the tire, on a larger scale, showing a section through the tire, and with one of the beads shown on a still larger scale;

Figure 3 is an elevation of part of a reinforcement comprising a bundle of parallel fibers of hemp or the like;

Figure 4 is a similar elevation of a different reinforcement made up of twisted pulp yarns;

Figure 5 is an elevation of part of one of the yarns of Figure 4, during its manufacture; and Figure 6 is a section of a completed tire bead containing the pulp yarns or twines as a bundle.

Figures 1 and 2 illustrate a section 10 of an automobile tire, which, except for the bead reinforcement, may be of the usual construction, built up with rubber material and fabric or cords, molded under pressure and vulcanized.

The reinforcement for the bead may take the form of an annular bundle, or endless ring, 12 of parallel non-metallic fibers, for example of sisal or manila hemp. The fibers may be held together, prior to incorporation in the tire, by any suitable means, as for example by being spirally wrapped with a light twine 14.

Alternatively I may start with a roving 16 of rod-like cross-section which is made by furling a pulp ribbon 18 of waterlaid interfelted fibers, preferably laid mainly lengthwise of the ribbon 18, a plurality of such rovings (e. g. four) being plied or intertwisted to form a yarn 20.

The ring 12 or 20 may be saturated with vulcanizable material, such as rubber cement, rubber latex, or the like, squeezed free of excess rubber, and wrapped with the usual flipper strip or wrapper 22. In fabricating the tire, the reinforcement 12 or 20 is imbedded in the bead 24 between the usual rubber-impregnated fabric plies of the tire, these plies being wrapped around the reinforcement 12 or 20 as shown in Figure 2. The fibers of the reinforcement are both bonded together and insulated from each other by the rubber material.

A tire built up in this manner may be built on a drum, and given its final shape on the usual expanding form, without danger of damage to the bead, on account of the considerable lateral flexibility of the non-metallic fibers, as compared to wire. The beads 24 are formed, in the molding of the tire, into the shape shown in Figure 2, during which process the fibers of the rings 12 or 20 shift on each other sufficiently to give the reinforcements the generally triangular cross-sectional shape shown in that Figure. Thereupon, the vulcanization of the tire binds the reinforcement firmly in place, and binds the unwoven fibers of the reinforcement firmly together, so that the reinforcement becomes in effect an integral part of the bead.

The pulp ribbon 18 is made up of interfelted waterlaid cellulosic fibers, deposited from a dilute aqueous solution on a wire belt as in ordinary paper-making practice. While still moist, the ribbon is readily furled from edge to edge to the desired rod-like form, as by being led through furling belts or over a furling roll. Since the ribbon is furled while moist, there is no tendency for it to open up again or unfurl.

The above-described reinforcements have low stretchability under tension. Where the ribbon 18 is used, it may be of chemical wood pulp. I prefer to use, for either form, fibers of high pentosan content, and while this may be kraft or sulphate pulp, I consider that the best results are obtained by using long-fibered material such as sisal or manila hemp, which may be cooked in an alkaline liquor, as for example a sodium sulphite solution, to give a fibrous material of high pentosan content.

While particular structures and arrangements have been described in detail, it is not my intention to limit the scope of the invention by that description, or otherwise than by the terms of the appended claims. The present application is a continuation in part of my application No. 695,446, filed October 27, 1933.

I claim:

1. In a pneumatic tire, a tire bead existing as a substantially non-stretchable reinforcement in the base portion of said pneumatic vehicle tire carcass, said bead comprising a plurality of multi-ply pulp yarns and rubber serving to insulate the yarns from one another and to unite said yarns, the plies of said yarns consisting of ribbons of interfelted cellulose fibers and said yarns extending circumferentially of the tire and being bonded together by the rubber of the tire 2. A tire having inextensible beads provided with non-metallic substantially non-stretchable reinforcements consisting of rings of unwoven fibers incorporated into the material of the tire and having the fibers arranged parallel to each other and extending substantially circumferentially of the tire and bonded together by material forming a vulcanized part of the tire.

3. A tire having inextensible beads provided with non-metallic substantially non-stretchable reinforcements comprising rings of unwoven parallelly-arranged fibers impregnated with rubber material and vulcanized to and bonded together by material forming a vulcanized part of the tire and extending substantially circumferentially of the tire.

GUY F. CROWLEY.